Figure 1:
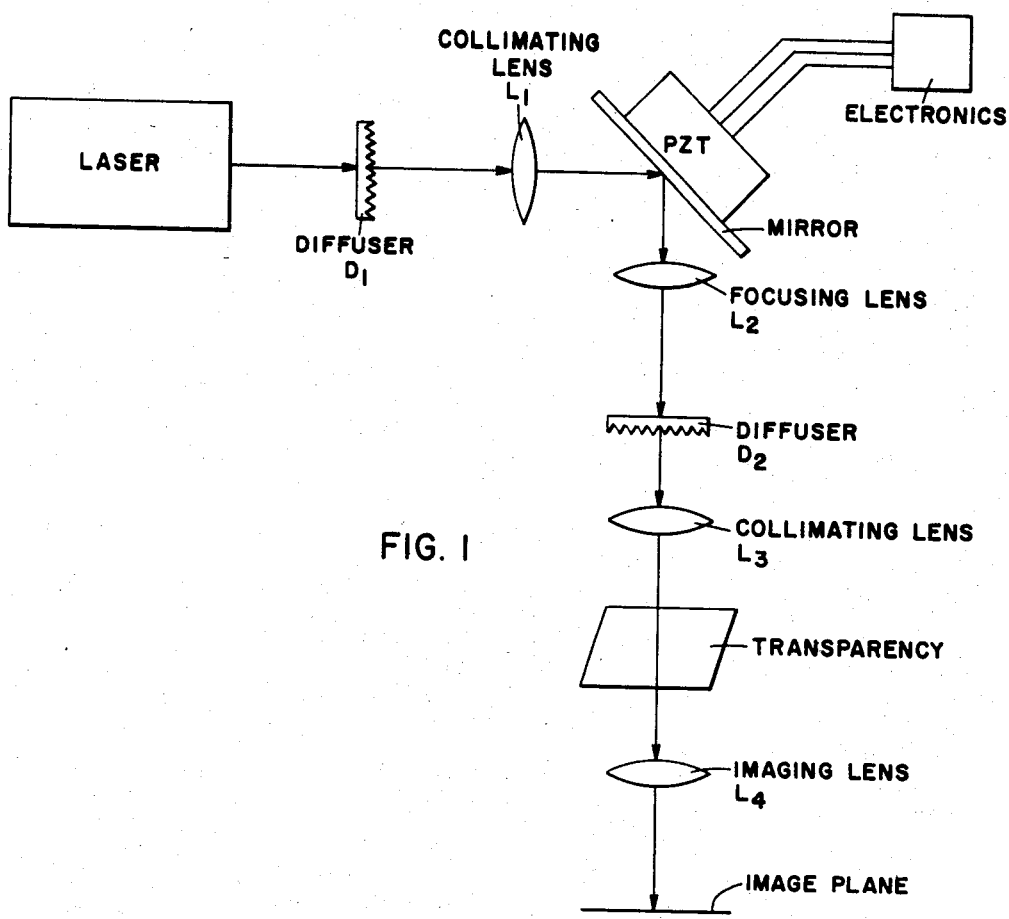

United States Patent
Ih 4,155,630
May 22, 1979

[54] SPECKLE ELIMINATION BY RANDOM SPATIAL PHASE MODULATION

[75] Inventor: Charles C. Ih, Newark, Del.

[73] Assignee: University of Delaware, Newark, Del.

[21] Appl. No.: 852,285

[22] Filed: Nov. 17, 1977

[51] Int. Cl.² .................... G02B 5/02; G02B 27/00
[52] U.S. Cl. ................... 350/188; 350/3.67; 350/3.77; 350/3.85; 350/162 R; 353/122
[58] Field of Search ............ 350/3.67, 3.75, 3.77, 350/3.81, 3.85, 3.86, 162 R, 162 SF, 6.5, 188; 353/122

[56] References Cited

U.S. PATENT DOCUMENTS

| 3,588,217 | 6/1971 | Mathisen | 350/3.85 |
| 3,782,804 | 1/1974 | Kanazawa et al. | 350/3.82 |
| 3,867,009 | 2/1975 | Pawluczyk | 350/3.67 |
| 3,941,456 | 3/1976 | Schilz et al. | 350/188 |
| 4,035,068 | 7/1977 | Rawson | 350/188 |

OTHER PUBLICATIONS

Rawson et al., Jour. of the Optical Society of America, vol. 66, No. 2, Feb. 1976, pp. 176–177.
Lowenthal et al., Jour. of the Optical Society of America, vol. 61, No. 7, Jul. 1971, pp. 847–851.

Primary Examiner—Ronald J. Stern

[57] ABSTRACT

A process and apparatus for improving image creation in a coherent light imagery system which involves directing diffused laser light onto a mirror having a rocking motion that will cause the reflected rays to sweep a two-dimensional area and focusing the reflected light through a diffuser before collimating same for use in image creation. More particularly, this invention creates the rocking motion by applying a combination of voltages to three independent piezo-electric crystals upon which the mirror is mounted.

5 Claims, 4 Drawing Figures

SPECKLE ELIMINATION BY RANDOM SPATIAL PHASE MODULATION

Optical information processing using coherent light from lasers has promised great versatility, great information capacity and high speed since the invention of lasers in the early sixties. This includes imaging deblurring, pattern recognition, matched filter imaging processing, half-tone dot or line removal, active optical feedback image processing and optical holography. A major drawback of these coherent imagery systems is that because the light is coherent any small imperfections in the system will be manifested as very distracting diffraction patterns. While diffraction patterns can be eliminated by using a diffused laser light, the cure is, however, even worse than the disease. Because when a diffused laser light is used, a phenomenon known as speckle which is far more distracting as far as imagery is concerned, is produced.

Literally hundreds of theoretical and experimental papers have been written on this subject and more than a dozen "cures" have been proposed. S. Lowenthal and D. Joyeux in J. Opt. Soc. Am. 61,847 (1971) describe the use of a double diffuser system in which a slowly moving diffuser is placed before a stationary diffuser with some degree in the improvement of the image. However, as recently as January 1976, Dr. Nicholas George of California Institute of Technology claimed "*still there is no simple, direct cure for speckle, and logically, no hope for one.*" (Optics News, P. 14 January 1976). A similar pessimistic view was expressed by Dr. Dennis Gabor, the 1971 physic Nobel Proze Laureate for his invention of holography (IBM J. Res. Develop. 14, 509 (1970). The logic is sound. Since in order to "cure" the speckle, say to obtain a signal-to-noise ratio (SNR) of 100, 10,000 independent speckled images must be superimposed to obtain the final image! A quest could not be easily achieved with then known techniques.

It is the object of this invention to provide a system for speckle removal so that there will be no visually detectable difference between images obtained with laser light and those obtained with white light even for an optical system of f/600.

It is a further object of this invention to provide a method of producing Random Spatial Phase Modulation (RSPM) by which speckles can be completely eliminated, thereby, obtaining images with RSPM laser light that are virtually indistinguishable with those obtained with white light, and the measured Signal-to-Noise Ration (SNR) of the former approaches to those of the later.

These objects are accomplished by this invention which comprises directing diffused laser light onto a mirror having a rocking motion that will cause the reflected beam to scan a two-dimensional area and focusing the reflective light through a diffuser before collimating same for use in image creation. This can be accomplished by interposing in the path of the laser light, between the initial diffuser and the final collimating lenses, a mirror mounted on three independent piezo-electric crystals and means for independently applying voltages to said crystals to cause the mirror to have a three-dimensional rocking motion.

One method of accomplishing this result consists in the use of two diffusers, two lenses and a mirror mounted on a piezo-electric translator/tilter before the final collimating lens. The first diffuser is imaged onto the second through the lenses and the mirror. The mirror can be translated or tilted, causing the laser beam to sweep over the second diffuser in any desired manner. This simulates the diffuser movement necessary for generating the RSPM.

In this system the laser beam is passed through a diffuser and a collimating lens onto a mirror. The motion of the mirror is controlled by a Piezoelectric translator/tilter with 3 independent piezo-electric crystals spaced 120° apart. By applying proper combinations of voltages to the crystals, the mirror can be translated or tilted causing the laser light to sweep over areas of the second lens which is a focusing lens and hence cause the focus light to scan the second diffuser.

This invention is better understood by reference to the drawings. For example, the above RSPM System is illustrated in FIG. 1 of the drawings which discloses in diagrammatical form a complete system from the laser to the final image.

Figure 2:
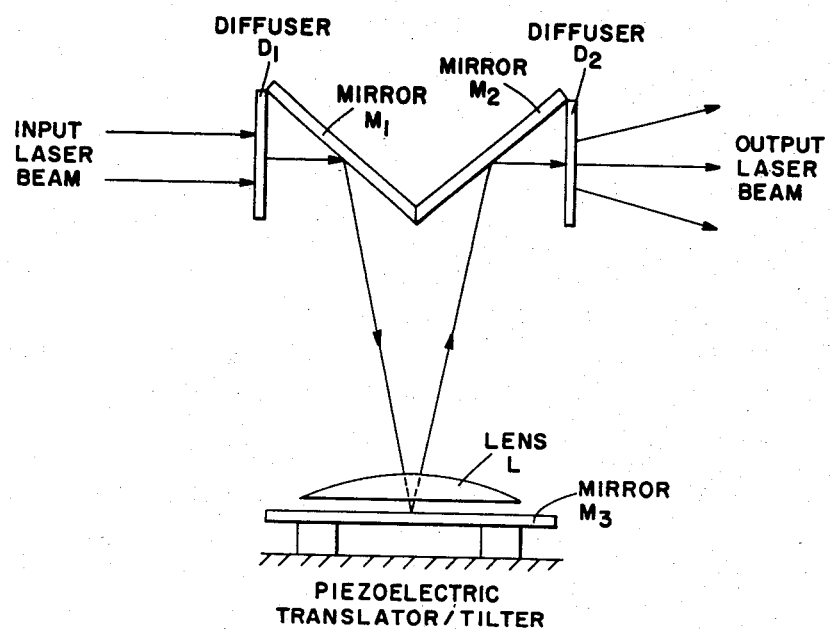
Figure 3:
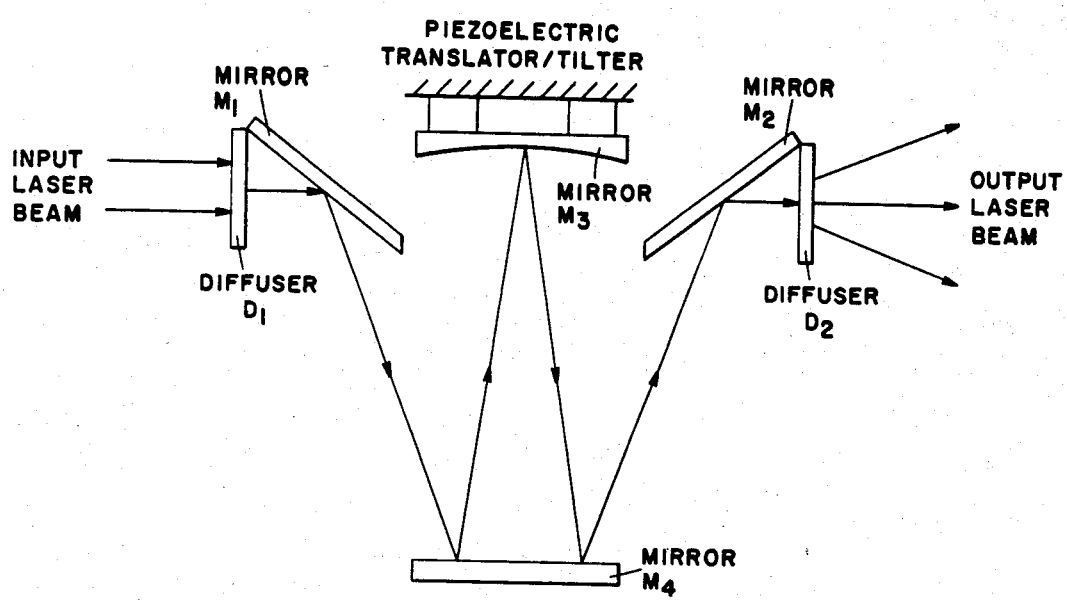

The RSPM system can be varied by replacing the two lenses between the two diffusers with a single lens affixed to or just above the mirror as shown in FIG. 2 or by a concave mirror as shown in FIG. 3, or combination of the two. The same effect can also be obtained by using a piezo-electric translator/tilter on any or all the mirrors $M_1$, $M_2$, $M_3$, and $M_4$.

Figure 4:
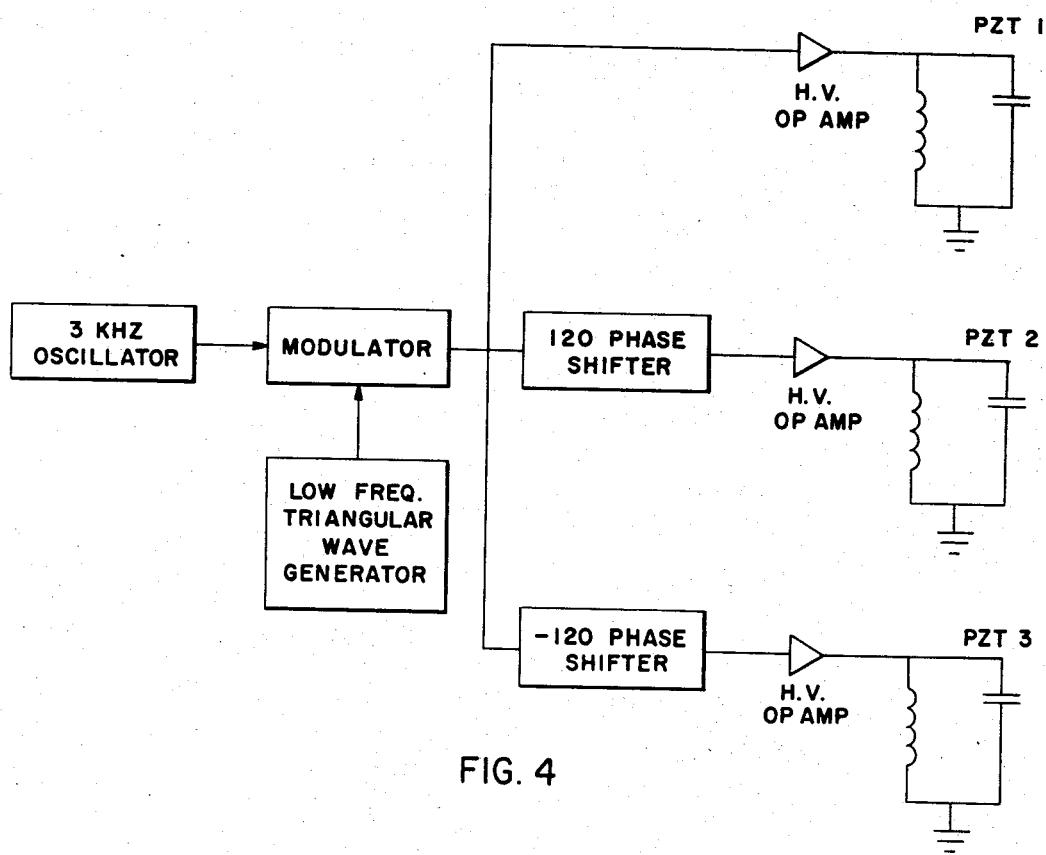

FIG. 4 is a schematic of a 3 KHz spiral drive for the three piezo-electric crystals.

One way of increasing the SNR is to cause the laser beam to move over the second diffuser in a circular pattern. This is easily accomplished by applying a 3-phase sinsoidal voltage to the PZT. Except for hysteresis, the PZT responds approximately linearly to the applied voltage. The laser beam can also be made to scan over the second diffuser in many other patterns, such as that of a parallelogram, a hexagon, a random pattern, an ellipse, etc. When a voltage is applied to these crystals, depending on the polarity, they will either expand or contract. The expansion or contraction will cause the plane determined by the three crystals to tilt.

It has been found that the greatest increase in SNR can be obtained when the amplitude of the 3-phase voltage is linearly varied causing the laser beam to move over the second diffuser in a spiral pattern. The number of encirclements that the spiral pattern makes is referred to as the number of scans. For instance, the use of the 60 Hz, 3-phase voltage to obtain a 600 spiral scan, which can produce a SNR of one thousand or more, requires an integration time of 10 seconds. However, commercially available piezo-electric translators can be used at frequencies up to several KHz. At 3 KHz, the integration time would be only 0.2 seconds. Of course, such a large SNR is probably never practically employed. In practice a SNR of a few hundred is probably sufficient. This requires about 10 scans for an integration time of 3.3 msec. (at 3 KHz).

Increasing the number of scans cannot result in an indefinitely large SNR. As the number of scans is increased, the spiral becomes more tightly packed together, until eventually the speckle patterns obtained from adjacent spiral paths are no loner uncorrelated. If the 2-dimensional scan covers an area A, the maximum SNR obtainable is $$(SNR)_{max} = \sqrt{A/L^2}$$

If the area is a circle of radius r, then $$(SNR)_{max} = \sqrt{\pi}\, r/L$$

A schematic of a 3 KHz spiral drive is shown in FIG. 4. The modulator combines the outputs of the sine-wave and triangular wave generators to produce a 3 KHz output with a triangular envelope.

With 3 independent piezo-electric crystals on the PZT, other 2-dimensional scan patterns are possible.

The finer the structure of the diffuser, the shorter the correlation distance becomes. With all other conditions the same, a finer diffuser will produce a large SNR. Therefore, finer diffusers are preferred in this application.

The effective correlation length can also be reduced by increasing the aperture of the lens. Thus, whenever possible, a lenses of large apertures should be used.

An RSPM similar to that shown in FIG. 2 was constructed using commercially available components. The measured SNR from the constructed RSPM after correction of film grain noise is 137 for the f/600 system and 151 for that of the f/40 system.

The RSPM can also be used in holography for reducing or eliminating the speckle. The simplest way to incorporate RSPM is to replace the point light source in the reconstruction beam by a small area RSPM laser light source. The hologram can be recorded in the usual way. The object of hologram can be rough 3-D objects or slides illuminated with a large area diffused laser light.

When holograms are made using slides as the object which must be illuminated with a small diffused laser light source such as in the case of Fourier Color hologram, the RSPM must also be incorporated in the recording process in order that the speckle reduction be effective. The recording process is modified as outlined below. The small diffused laser light source in the object beam is replaced with one using RSPM. The reference beam remains unchanged. Since holograms cannot be recorded when the RSPM is in continuous motion, the continuous RSPM movement is replaced by discrete steps. This is effectively making many holograms with RSPM at different phase combinations. Or alternatively, the RSPM laser light source is used both in the object and reference beam. During the reconstruction, the point light source of the reconstruction beam is replaced by a small area RSPM as described above.

The RSPM reconstruction process generally reduces the resolution of the hologram. By using a very small RSPM source for the reconstruction beam and placing the object very close to the holograms, the reduction in resolution can be greatly reduced. This small reduction in resolution is more than offset by the increase in resolution as a result of eliminating or reducing the speckle.

While particular examples of the present invention have been shown and described, it is apparent that changes and modification may be made therein without departing from the invention in its broader aspects. The aim of the appended claims, therefore, is to cover all such changes and modifications as fall within the true spirit and scope of the invention.

I claim:

1. A process for improving image creation by speckle elimination in a coherent light imagery system which comprises directing diffused laser light onto a mirror having a rocking motion that will cause the reflected rays to sweep a two-dimensional area and focusing the reflected light through a diffuser before collimating same for use in image creation.

2. The process of claim 1 wherein the rocking motion is created by applying a combination of voltages to three independent piezo-electric crystals upon which the mirror is mounted.

3. The process of claim 1 wherein the rocking motion of the mirror causes the reflected rays to scan in a circular pattern.

4. The process of claim 1 wherein the rocking motion of the mirror causes the reflected rays to scan in a spiral pattern.

5. An apparatus for improving image creation by speckle elimination using coherent light comprising an initial diffuser and a final diffuser, means for imaging the initial diffuser on the final diffuser, a mirror interposed in the path of the light between the initial diffuser and the final diffuser and mounted on three independent piezo-electric crystals and means for independently applying voltages to said crystals to cause the mirror to have a three-dimensional rocking motion.

* * * * *